US008884950B1

United States Patent
Brown et al.

(10) Patent No.: US 8,884,950 B1
(45) Date of Patent: Nov. 11, 2014

(54) POSE DATA VIA USER INTERACTION

(75) Inventors: Brian Gammon Brown, Longmont, CO (US); Zhe Fan, Boulder, CO (US); Tilman Reinhardt, Woodside, CA (US)

(73) Assignee: Google Inc., Mountain View, CA (US)

( * ) Notice: Subject to any disclaimer, the term of this patent is extended or adjusted under 35 U.S.C. 154(b) by 602 days.

(21) Appl. No.: 13/194,177

(22) Filed: Jul. 29, 2011

(51) Int. Cl.
*G06T 15/00* (2011.01)
*G06T 15/20* (2011.01)

(52) U.S. Cl.
CPC ..................................... *G06T 15/00* (2013.01)
USPC ............................ 345/419; 345/420; 345/619

(58) Field of Classification Search
CPC ... G06F 3/0346; G06F 3/04815; G06T 15/20; G06T 15/205; G06T 19/00; G06T 17/00; G06T 15/00
USPC .......................................... 345/419, 420, 619
See application file for complete search history.

(56) References Cited

U.S. PATENT DOCUMENTS

| 6,912,293 | B1 | 6/2005 | Korobkin |
| 7,193,633 | B1 | 3/2007 | Reinhardt et al. |
| RE41,175 | E | 3/2010 | Vashisth et al. |
| 7,728,833 | B2 | 6/2010 | Verma et al. |
| 8,026,929 | B2 * | 9/2011 | Naimark ....................... 345/629 |
| 8,264,504 | B2 * | 9/2012 | Naimark ....................... 345/629 |
| 8,437,535 | B2 * | 5/2013 | Boca et al. ..................... 382/154 |
| 2005/0186361 | A1 | 8/2005 | Fukuda et al. |
| 2008/0225044 | A1 | 9/2008 | Huang et al. |
| 2009/0141020 | A1 | 6/2009 | Freund et al. |
| 2009/0141966 | A1 | 6/2009 | Chen et al. |
| 2009/0245691 | A1 * | 10/2009 | Naimark et al. .............. 382/285 |
| 2010/0001998 | A1 * | 1/2010 | Mandella et al. ............. 345/419 |
| 2011/0227915 | A1 * | 9/2011 | Mandella et al. ............. 345/419 |
| 2012/0044247 | A1 * | 2/2012 | Naimark ....................... 345/419 |
| 2012/0218263 | A1 * | 8/2012 | Meier et al. .................. 345/419 |

OTHER PUBLICATIONS

Lourakis et al., "SBA: A Software Package for Generic Sparse Bundle Adjustment", ACM Transactions on Mathematical Software, vol. 36, No. 1, Article 2, Mar. 2009, 1 page.

Verma et al., "3D Building Detection and Modeling from Aerial LIDAR Data" Proceedings of the 2006 IEEE Computer Society on Computer Vision and Pattern Recognition (CVPR '06), IEEE Computer Society, 2006, 8 pages.

* cited by examiner

*Primary Examiner* — Kimbinh T Nguyen

(74) *Attorney, Agent, or Firm* — Dority & Manning, P.A.

(57) ABSTRACT

Embodiments improve pose data for images via user interaction. A user may model a building in a web browser plug in by mapping positions on two-dimensional images to a three-dimensional model of a building shown in the image. Each of the images may have associated original pose data, which includes information related to a position and orientation of a camera which took the image. Upon modeling the building, pose data may be adjusted to more accurately depict the building as a three-dimensional model. If the adjusted pose data is superior to the original pose data, the adjusted pose data may be associated with the image.

19 Claims, 4 Drawing Sheets

US 8,884,950 B1

POSE DATA VIA USER INTERACTION

BACKGROUND

1. Field

This field is generally related to photogrammetry.

2. Related Art

Three-dimensional modeling tools and other computer-aided design (CAD) tools enable users to define three-dimensional models, such as a three-dimensional model of a building. Photographic images of the building may be available from, for example, satellite, aerial, vehicle-mounted streetview and user cameras. The photographic images of the building may be texture mapped to the three-dimensional model to create a more realistic rendering of the building.

BRIEF SUMMARY

Embodiments relate to improving pose data for imagery via user interaction. In an embodiment, a first user input including a user-selected location is received. A plurality of images, each of which shows a building at the user-selected location, is provided. Original pose data associated with each of the plurality of images is also provided. The original pose data represents at least a position and an orientation of a camera that took the associated image. A second user input mapping a selected position on a two-dimensional image from the plurality of images to a selected feature of a three-dimensional model of the building is received. Adjusted pose data for the two-dimensional image is calculated, such that when the three-dimensional model is rendered with the two-dimensional image from a perspective specified by the adjusted pose data, the feature of the three-dimensional model appears at the position of the two-dimensional image. A determination as to whether the adjusted pose data is superior to the original pose data is made. If the adjusted pose data is superior to the original pose data, the adjusted pose data is associated with the two-dimensional image.

Systems and computer program products for improving pose data for imagery via user interaction are also described.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments relate to improving pose data for images via user interaction. A user may model a building in a web browser plug in. The user may be presented with a set of two-dimensional images displaying a particular building to be modeled. Each of the images may have associated original pose data, which includes information related to a position and orientation of a camera that took the image.

A user may specify various three-dimensional shapes that correspond to the building, such as boxes, gables, pyramids, or other shapes. In the process of specifying the three-dimensional shapes, the user may correlate or constrain points of the three-dimensional shape to points on a two-dimensional image. In the process of accurately constraining the points of the three-dimensional shape to the two-dimensional image, the pose data of the image may need to be adjusted in some way. For example, the orientation of the camera may be slightly changed. If the adjusted pose data is superior to the original pose data, the adjusted pose data may be associated with the image. The adjusted pose data may then be provided in the future when the particular image is provided.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments Whether or not explicitly described.

Figure 1:
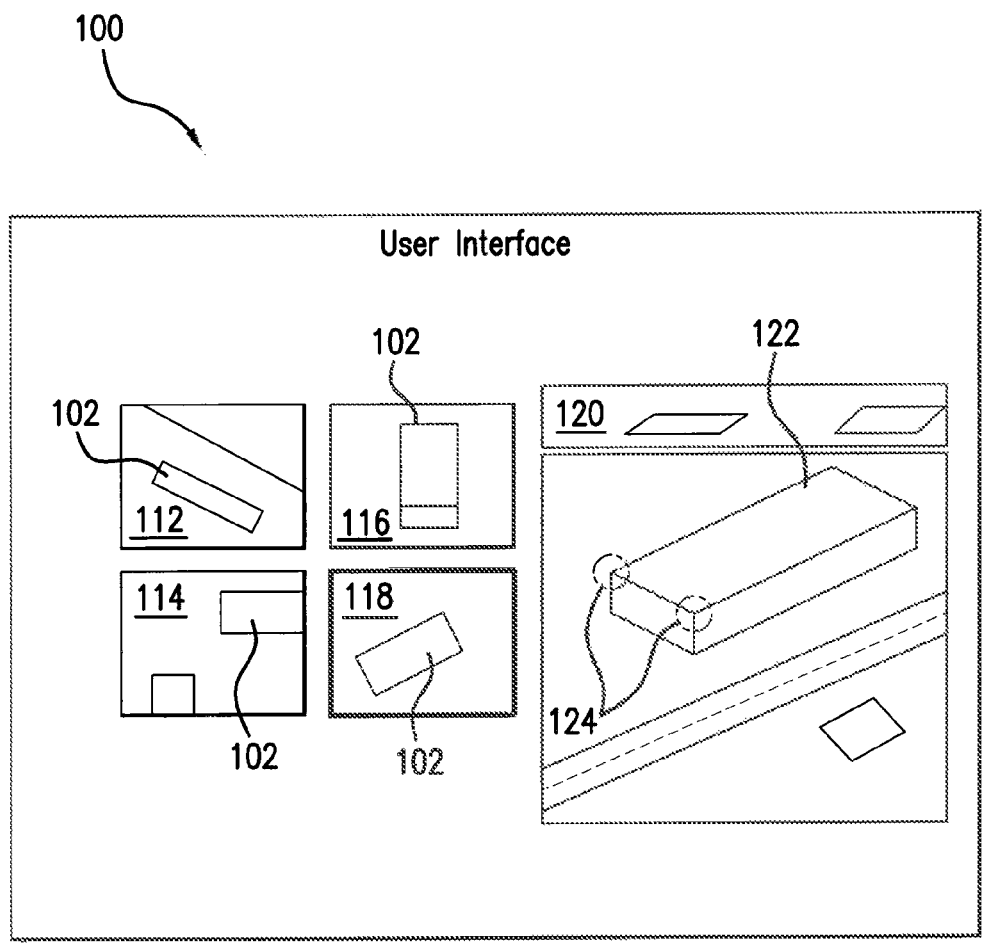
FIG. 1 is a diagram illustrating construction of a three-dimensional model using a plurality of two-dimensional images.

FIG. 1 shows a diagram showing a user interface 100 of an image-based modeling service for creating a three-dimensional model from two-dimensional images. As described below, user interface 100 may, in an embodiment, be a web based user interface. In the embodiment, a server may serve to a client data, such as Hypertext markup language (HTML) data, Javascript, or animation data, specifying user interface 100. Using such data, the client may render and display user interface 100 to a user.

User interface 100 includes images 112, 114, 116, and 118 of a building 102. Each of images 112, 114, 116, and 118 is a photographic image capturing building 102 from a different perspective. Each of images 112, 114, 116, and 118 may be an aerial or satellite image and may have oblique and nadir images. Further, one or more of images 112, 114, 116, and 118 may be a photographic image captured from street level, such as a portion of a panoramic image captured from a vehicle in motion. Each of images 112, 114, 116, and 118 may have associated original pose data, which includes information related to a position and orientation of a camera which captured each image. Each of images 112, 114, 116, and 118 may be displayed with an indication (such as a colored outline) indicating whether a user constraint has been received for the image. Constraints may be points defined by an x, y and z value. Constraints may map a position on an image to a three-dimensional model of the building 102.

Figure 2:
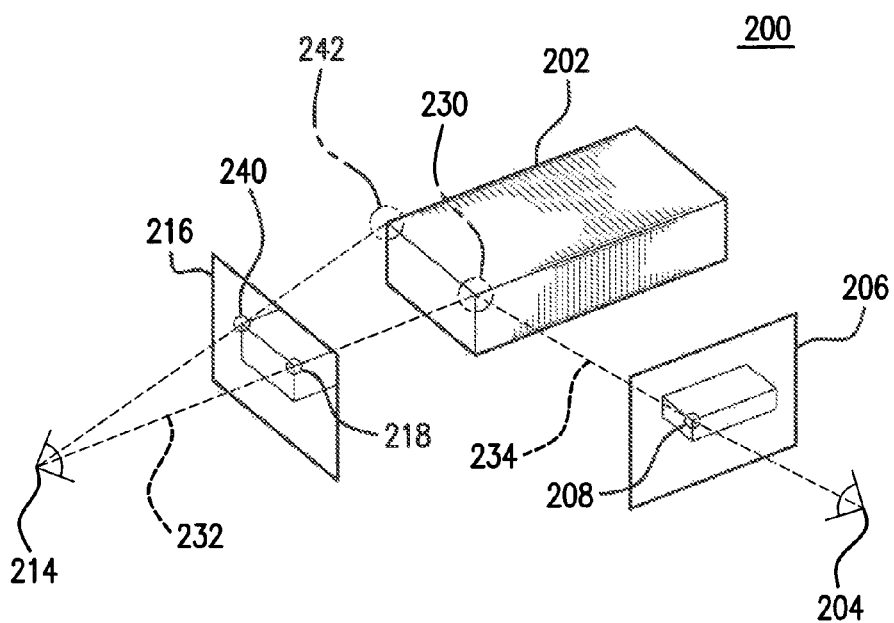
FIG. 2 is a diagram illustrating creating a three-dimensional model from user selections in two-dimensional images.

In an example, a user may select one of images 112, 114, 116, and 118 to display in a viewport 120. In viewport 120, a three-dimensional model 122 may be displayed. Three-dimensional model 122 may be displayed, for example, as a wireframe structure so as to avoid obscuring the photographic image in viewport 120. By selecting points, such as points 124, on three-dimensional model 122, a user may constrain three-dimensional model 122 to the image in viewport 120. More specifically, a user may indicate that a position on the three-dimensional model corresponds to a position on the photographic image in viewport 120. By inputting constraints for the plurality of images 112, 114, 116, and 118, a user can specify where three-dimensional model 122 appears in each of the images. Based on the user specifications, the geometry of three-dimensional model 122 may be determined using a photogrammetry algorithm as illustrated in FIG. 2. In this way, a user may define three-dimensional model 122 to model building 102 using images of the building.

FIG. 2 shows a diagram 200 illustrating creating a three-dimensional model from user selections in two-dimensional images. Diagram 200 shows a three-dimensional model 202 and multiple photographic images 216 and 206 of a building. Images 216 and 206 were captured from cameras having different perspectives, as illustrated by camera 214 and 204. Images 216 and 206 may be associated with the pose data representing the position and orientation of camera 214 and camera 204, respectively. As mentioned above, a user may input constraints on images 216 and 206, such as constraints 218 and 208, and those constraints may be used to determine the geometry of three-dimensional model 202. The geometry of three-dimensional model 202 may be specified by a set of geometric parameters, representing, for example, a position of an origin point (e.g., x, y, and z coordinates), a scale (e.g., height and width), an orientation (e.g., pan, tilt, and roll). Depending on a shape of three-dimensional model 202 (e.g., box, gable, hip, pyramid, top-flat pyramid, or ramp) additional geometric parameters may be needed. For example, to specify the geometry of a gable, the angle of the gable's slopes or a position of the gable's tip may be included in the geometric parameters.

To determine the geometry of three-dimensional model 202, the user constraints from the images may be used to determine rays in three-dimensional space and the rays are used to determine the geometry. In diagram 200, a ray 232 may be determined based on user constraint 218, and a ray 234 may be determined based on a user constraint 208. Rays 232 and 234 are constructed based on parameters associated with cameras 214 and 204 respectively. For example, ray 232 may be extended from a focal point or entrance pupil of camera 214 through a point corresponding to user constraint 218 at a focal length distance from the focal point of camera 214. Similarly, ray 234 may be extended from a focal point or entrance pupil of camera 204 through a point corresponding to user constraint 208 at a focal length distance from the focal point of camera 204. Using rays 232 and 234, a position 230 on three-dimensional model 202 may be determined. This process is known as photogrammetry. In this way, the geometry of three-dimensional model 202 may be determined based on user constraints 218 and 208, and parameters representing cameras 214 and 204.

However, the parameters, or pose data, representing cameras 214 and 204 may not be accurate. In an embodiment, the pose data may include a position, orientation (e.g., pan, tilt, and roll), angle, focal length, prism point, and a distortion factor of each of cameras 214 and 204. In an example, photographic images 216 and 206 may have been taken from satellites, vehicles, or airplanes, and the camera position and orientation may not be completely accurate. Alternatively, one or both of photographic images 216 and 206 may have been taken by a user with only a general idea of where her camera was positioned when it took the photo. Further, one of photographic images 216 or 206 may have been provided by a user without any idea of where her camera was positioned when it took the photo.

A photogrammetry algorithm may be used to solve both the camera parameters or pose data representing the cameras that took the photographic images and geometric parameters representing the three-dimensional model. This may represent a large and complex non-linear optimization problem. In cases where pose data for an image is inaccurate, pose data for an image may be improved or adjusted using constraints input by users. Adjusted pose data can then be associated with the image, such that the improved pose data can be used in further modeling of the building or other buildings.

Figure 3:
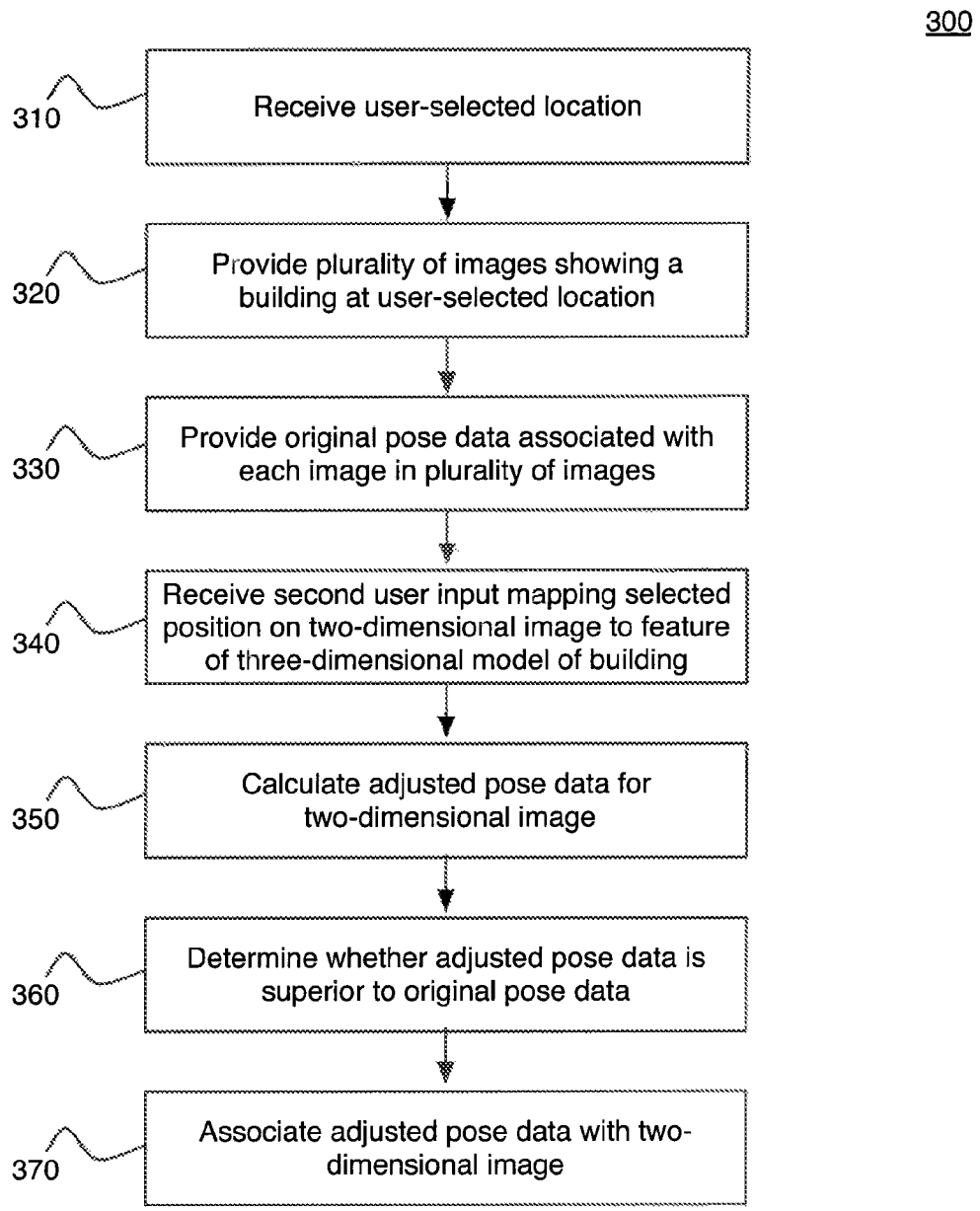
FIG. 3 is a flowchart showing a method for determining pose data for a user-provided image.

FIG. 3 is a flowchart showing a method 300 for improving pose data for an image via user interaction. Method 300 begins at step 310, where a first user input including a user-selected location is received. The first input may be an address, a latitude and longitude location, or may correspond to a user navigating on a map in a geographical information system to a selected location.

At step 320, a plurality of images is provided to the user. Each of the plurality of images shows a building at the user-selected location. For example, images 112, 114, 116, and 118 may be provided for display to the user, each of which shows building 102. The plurality of images may be presented in a user interface 100.

At step 330, original pose data associated with each of the plurality of images provided at step 320 is provided. The original pose data may represent at least a position and orientation of a camera that took the associated image. Original pose data may also include a camera focal length and a global positioning system (GPS) location. Original pose data may further include an angle, prism point, or distortion factor of the camera that took each image in the plurality of images.

At step 340, a second user input is received. The second user input may map a selected position on a two-dimensional image from the plurality of images provided at step 320 to a selected feature of a three-dimensional model of the building. As described above, the user may select an image to display in a viewport. The user may model a building using one or more three-dimensional shapes, such as a box. At step 340, the user may map a position on one of the images provided at step 320 to a feature of the box to model the building three-dimensionally. The second user input may include constraint points for the selected feature of the three-dimensional model of the building.

At step 350, adjusted pose data may be calculated based on the mapping at step 340. The adjusted pose data is calculated such that, when the three-dimensional model specified by the user is rendered with the two-dimensional image from a perspective specified by the adjusted pose data, the feature of the three-dimensional model appears at the position of the two-dimensional image. For example, the adjusted pose data may modify the orientation or position of the image such that the feature of the three-dimensional image appears at the selected position. The adjusted pose data may be calculated by a photogrammetry algorithm.

At step 360, the adjusted pose data may be compared to the original pose data to determine whether the adjusted pose data is superior to the original pose data. The determination may be made as part of a quality assurance process performed by an administrative user. For example, an administrative user may determine whether the adjusted pose data is more accurate than the original pose data.

At step 370, if the adjusted pose data is determined to be superior to the original pose data, the adjusted pose data is associated with the two-dimensional image. The adjusted pose data may then be provided with the two-dimensional image when it is provided to a user in accordance with step 320 of method 300. The adjusted pose data may also be used in further applications as described further herein.

In embodiments, the user may map a selected position on multiple two-dimensional images to a selected feature of a three-dimensional model of a building. A photogrammetry algorithm may determine adjusted pose data for each of the two-dimensional images. In further embodiments, a user may first map positions on a well posed image to a selected feature of a three-dimensional image. Well posed images may be those images with pose data that has already been adjusted, or that is known to have accurate pose data information. Once the user has done so, the user may then map positions on poorly posed images to selected features, to improve the pose data of those poorly posed images.

In embodiments, after a user has mapped a position on a two-dimensional image to a selected feature of a three-dimensional model of a building, the user may add her own user-supplied two-dimensional image. The user may then map positions on the user-supplied two-dimensional image to a feature of the three-dimensional model of the building. Adjusted pose data may be calculated for the user-supplied image.

Original pose data for an image or images may be determined by a bundle adjustment process. Given a set of images depicting a number of points from different viewpoints, a bundle adjustment process may refine camera pose or calibration values by attempting to jointly optimize camera pose or calibration values for all images in the set. That is, a bundle adjustment process attempts to optimize pose data for a camera for multiple images depicting the same scene. For example, if a set of images depicts a particular building from different viewpoints, bundle adjustment may be used to determine pose data values for the cameras which captured the images. Thus, as described above, original pose data may be obtained using raw images provided to a bundle adjustment process. The original pose data may serve as an estimate of pose data for the particular image.

Thus, in embodiments, after adjusted pose data is associated with an image, a bundle adjustment process may be performed on a set of images. In this way, the bundle adjustment process may improve original pose data associated with images near or similar to the image associated with the adjusted pose data. For example, adjusted pose data may be associated with image 216 of FIG. 2. A bundle adjustment process may be performed to adjust and improve pose data of image 206, in accordance with embodiments.

In some embodiments, a bundle adjustment process may be performed prior to allowing a user to model a building. Thus, a bundle adjustment process may be used to establish baseline original pose data for a set of images depicting a building. In some embodiments, the bundle adjustment process may be performed again once a threshold number of images are associated with adjusted pose data. In this way, pose data for other images may be incrementally improved.

The bundle adjustment may involve updating pose data for images that have not been used in modeling. To update the pose data for those images, a computing device may utilize information describing the change in pose between the images that have been used in modeling and the images that have not been used in modeling. In an example, images A, B, C, and D may be taken from an airplane traveling along a specific path. A user may use image B in image-based modeling to specify improved pose data. That improved pose data may be associated with image B. While improved pose data may be unavailable for images A, C, and D, the relative pose information between image B and each of images A, C, D may be known. For example, between the capture of images B and C, the plane may have moved 50 meters and turned 5 degrees. Using the relative pose information between image B and each of images A, C, D, the pose data for images A, C, D may be adjusted based on the improved pose data for image B.

Figure 4:
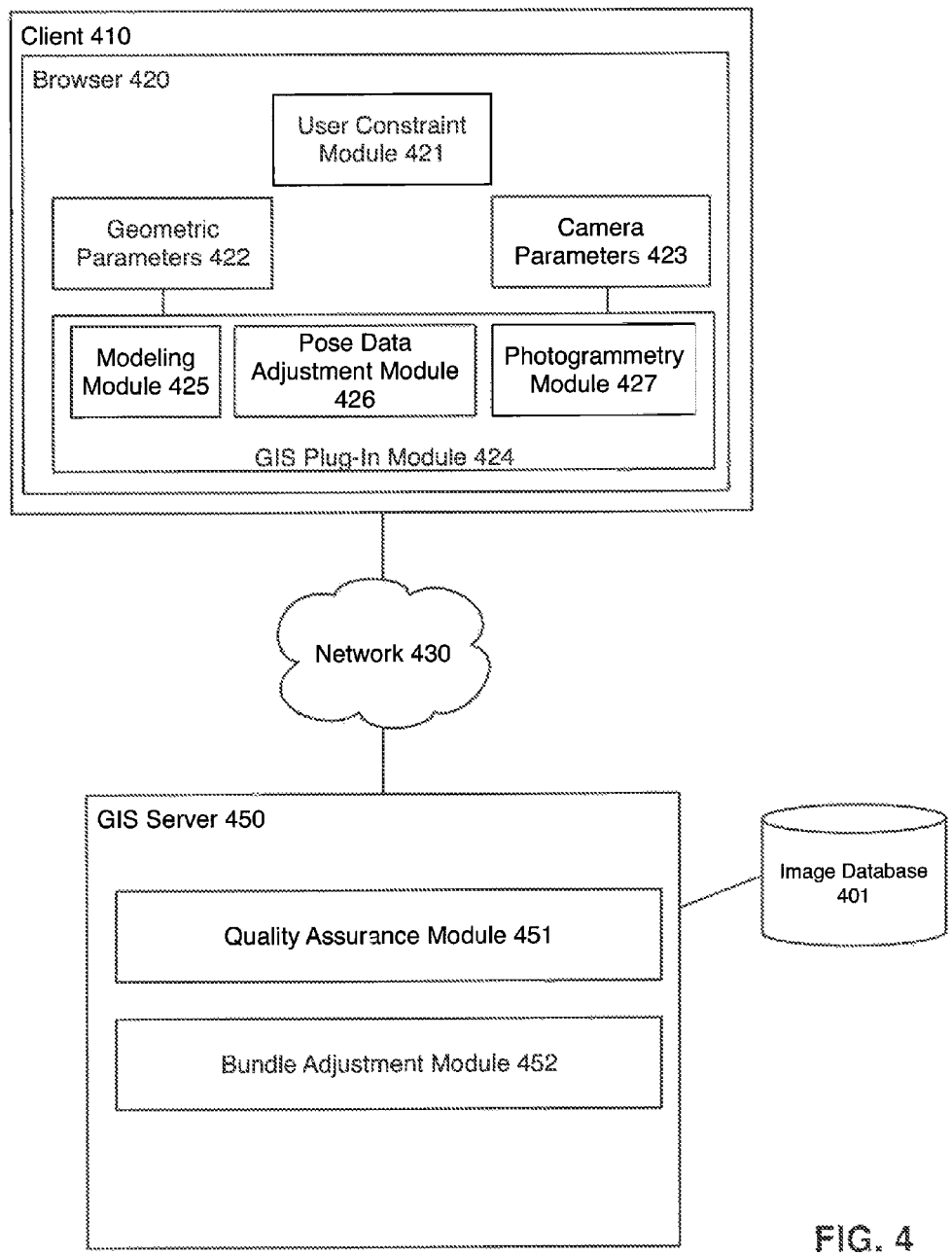
FIG. 4 is a diagram showing a system for determining pose data for a user-provided image.

FIG. 4 is a diagram showing a system 400 for improving pose data for images in accordance with embodiments. System 400 may operate as described above with respect to FIGS. 1-3. System 400 may include a client 410 coupled to a GIS server 450 via one or more networks 430, such as the Internet. Client 410 includes a browser 420. Browser 420 includes a user constraint module 421, a GIS plug-in module 424, geometric parameters 422 and camera parameters 423. GIS plug-in module 424 includes a modeling module 425, pose data adjustment module 426, and photogrammetry module 427. Each of these components is described below.

System 400 also includes image database 401. Image database 401 may store a collection of two-dimensional images used to model buildings. Images stored in image database 401 may be aerial or satellite images, or may have been captured from a moving vehicle. Further, images in image database 401 may be supplied by users. Images stored in image database 401 may not have associated pose data, or may be associated with original or adjusted pose data. Image database 401 may be a relational or non-relational database. Images stored in image database 401 may be accessed by client 410 and browser 420 from GIS server 450 over network 430.

In embodiments, browser 420 may be a known Internet browser. The components of browser 420 may be downloaded from a server, such as a web server, and executed on client 410. For example, the components of browser 420 may be Hypertext Markup Language (HTML), JavaScript, or a plug-in, perhaps running native code. GIS plug-in module 424 may be a browser plug-in implementing a pre-specified interface and compiled into native code.

Upon receipt of a user selection indicating a particular location at which to create a three-dimensional model, in accordance with step 310 of method 300, modeling module 425 may display a plurality of images showing a building at the user-selected location, in accordance with step 320. User constraint module 421 may display an interface that may display photographic images of the area in conjunction with modeling module 425. User constraint module 421 and modeling module 425 may retrieve the images from GIS server 450 and image database 401. As described herein, each image may be provided with original pose data, in accordance with step 330 of method 300.

GIS server 450 may include a web server. A web server is a software component that responds to a hypertext transfer protocol (HTTP) request with an HTTP reply. The web server may serve content such as hypertext markup language (HTML), extensible markup language (XML), documents, videos, images, multimedia features, or any combination thereof. This example is strictly illustrative and does not limit the embodiments described herein.

User constraint module 421, in conjunction with modeling module 425, may receive a user input mapping at least one position on a two-dimensional image received from GIS server 450 to a feature on a three-dimensional model, in accordance with step 340 of method 300. As described above, the two-dimensional image may be stored in image database 401. Mapping a position may also be known as inputting a constraint. Each constraint indicates that a position on the two-dimensional photographic image corresponds to a position on the three-dimensional model. In an embodiment, a user constraint module may receive a first user input specifying a first position on a first photographic image, and a second user input specifying a second position on a second photographic image. The second user input may further indicate that a feature located at the second position on the second photographic image corresponds to a feature located at the first position on the first photographic image.

Pose data adjustment module 426 may determine adjusted pose data for the two-dimensional image in accordance with step 350 of method 300. The adjusted pose data may be calculated such that when the three-dimensional model is rendered with the two-dimensional image from a perspective specified by the adjusted pose data, the feature of the three-dimensional model appears at the position of the two-dimensional image. Adjusted pose data may be calculated, in some embodiments, by photogrammetry module 427 and received by pose data adjustment module 426.

Pose data adjustment module 426 may store adjusted pose data in an extensible markup language (XML) document. In some embodiments, client 410 may transmit the XML document containing adjusted pose data to GIS Server 450.

Quality assurance module 451 may determine whether adjusted pose data provided by pose data adjustment module 426 is superior to original pose data associated with an image in accordance with step 360 of method 300. Quality assurance module 451 may also associate the adjusted pose data with the two-dimensional image when it determines that the adjusted pose data is superior in accordance with step 370. Quality assurance module 451 may receive adjusted pose data from pose data adjustment module 426 or photogrammetry module 427. Quality assurance module 451 may display an administrative interface to a user. The user may compare adjusted pose data for an image with original pose data associated with an image to determine if the adjusted pose data is superior. The administrative user may then associate the image with the adjusted pose data.

Bundle adjustment module 452 may receive adjusted pose data for one or more images. Based on this adjusted pose data, bundle adjustment module 452 may perform a bundle adjustment process on other images from image database 401 to improve pose data for those images. Bundle adjustment module 452 may also determine original pose data for a plurality of images using a bundle adjustment process.

Each of client 410 and GIS server 450 may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a general purpose processor, graphics processor, memory and graphical user interface display. The computing device may also have multiple processors and multiple shared or separate memory components. For example, the computing device may be a clustered computing environment or server farm.

Each of browser 422, user constraint module 421, GIS plug-in module 424, modeling module 425, pose data adjustment module 426, and photogrammetry module 427 may be implemented in hardware, software, firmware, or any combination thereof.

Each of geometric parameters 422 and camera parameters 423 may be stored in any type of structured memory, including a persistent memory, or a database. In examples, each database may be implemented as a relational database.

Adjusted pose data may improve user experience for users of an image-based modeling service. If adjusted pose data has been used to improve pose data for other images using a bundle adjustment process, a greater amount of images may be well posed. Well posed images may allow the building modeling process to be simpler. For example, users may not need to greatly adjust constraint points if images are well posed.

Adjusted pose data obtained in accordance with embodiments disclosed herein may be used in applications outside of image-based modeling. For example, images in a certain direction may be stitched together to create large seamless views, such as panoramas. Adjusted pose data may be specified for an image in the direction. A bundle adjustment process may be performed for other images, in the set to improve the seamless view. Improved pose data for one or more images may lead to a higher quality stitched image.

The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method of improving pose data for images, comprising:
   (a) receiving, by one or more computing devices, a first user input comprising a user-selected location;
   (b) providing, by the one or more computing devices, a plurality of images, each of the plurality of images showing a building at the user-selected location;
   (c) providing, by the one or more computing devices, original pose data associated with each of the plurality of images, the original pose data representing at least a position and orientation of a camera that took the associated image;
   (d) receiving, by the one or more computing devices, a second user input mapping a selected position on a two-dimensional image from the plurality of images to a selected feature of a three-dimensional model of the building;

(e) calculating, by the one or more computing devices, adjusted pose data for the two-dimensional image such that, when the three-dimensional model is rendered with the two-dimensional image from a perspective specified by the adjusted pose data, the feature of the three-dimensional model appears at the position of the two-dimensional image;

(f) determining, by the one or more computing devices, whether the adjusted pose data is superior to the original pose data;

(g) when the adjusted pose data is determined to be superior to the original pose data, associating, by the one or more computing devices, the adjusted pose data with the two-dimensional image; and (h) respectively updating, by the one or more computing devices, the original pose data associated with each of the plurality of images other than the two-dimensional image based on the adjusted pose data of the two-dimensional image and information describing a respective change in pose between the two-dimensional image and each of the plurality of images other than the two-dimensional image.

2. The method of claim 1, wherein the pose data further represents a camera focal length.

3. The method of claim 1, wherein the pose data further represents a global positioning system (GPS) location.

4. The method of claim 1, wherein the original pose data comprises pose data determined by an automatic bundle adjustment process.

5. The method of claim 1, wherein the second user input includes constraint points for the selected feature of the three-dimensional model of the building.

6. The method of claim 1, wherein the provided plurality of images comprise one or more of an oblique aerial photograph of the Earth, a panoramic photograph taken from street-level, or a photograph inputted by a user.

7. A system for improving pose data for images, comprising:
    one or more processors;
    a modeling module implemented by the one or more processors, wherein the modeling module:
        displays a plurality of images, each of the plurality of images showing a building at a user-selected location, wherein each of the plurality of images is associated with original pose data, the original pose data representing at least a position and orientation of a camera that took the associated image, and
        receives a user input mapping a selected position on a two-dimensional image from the plurality of images to a selected feature of a three-dimensional model of the building;
    a pose data adjustment module implemented by the one or more processors, wherein the pose data adjustment module calculates adjusted pose data for the two-dimensional image such that, when the three-dimensional model is rendered with the two-dimensional image from a perspective specified by the adjusted pose data, the feature of the three-dimensional model appears at the position of the two dimensional image;
    a quality assurance module implemented by the one or more processors, wherein the quality assurance module:
        determines whether the adjusted pose data is superior to the original pose data, and
        when the adjusted pose data is determined to be superior to the original pose data, associates the adjusted pose data with the two-dimensional image; and
    a bundle adjustment module implemented by the one or more processors, wherein the bundle adjustment module respectively updates the original pose data associated with each of the plurality of images other than the two-dimensional image based on the adjusted pose data of the two-dimensional image and information describing a respective change in pose between the two-dimensional image and each of the plurality of images other than the two-dimensional image.

8. The system of claim 7, wherein the pose data further represents a camera focal length.

9. The system of claim 7, wherein the pose data further represents a global positioning system (GPS) location.

10. The system of claim 7, wherein the original pose data comprises pose data determined by an automatic bundle adjustment process.

11. The system of claim 7, wherein the second user input further comprises constraint points for the selected feature of the three-dimensional model of the building.

12. The system of claim 7, wherein the provided plurality of images comprise one or more of an oblique aerial photograph of the Earth, a panoramic photograph taken from street-level, or a photograph inputted by a user.

13. A non-transitory, computer readable storage medium having instructions stored thereon that, when executed by a processor, cause the processor to perform operations including:

(a) receiving a first user input comprising a user-selected location;

(b) providing a plurality of images, each of the plurality of images showing a building at the user-selected location;

(c) providing original pose data associated with each of the plurality of images, the original pose data representing at least a position and orientation of a camera that took the associated image;

(d) receiving a second user input mapping a selected position on a two-dimensional image from the plurality of images to a selected feature of a three-dimensional model of the building;

(e) calculating adjusted pose data for the two-dimensional image such that, when the three-dimensional model is rendered with the two-dimensional image from a perspective specified by the adjusted pose data, the feature of the three-dimensional model appears at the position of the two-dimensional image;

(f) determining whether the adjusted pose data is superior to the original pose data;

(g) when the adjusted pose data is determined to be superior to the original pose data, associating the adjusted pose data with the two-dimensional image; and (h) respectively updating the original pose data associated with each of the plurality of images other than the two-dimensional image based on the adjusted pose data of the two-dimensional image and information describing a respective change in pose between the two-dimensional image and each of the plurality of images other than the two-dimensional image.

14. The non-transitory, computer readable storage medium of claim 13, wherein the pose data comprises one or more of a camera position, a camera orientation, or a camera focal length.

15. The non-transitory, computer readable storage medium of claim 13, wherein the pose data comprises a global positioning system (GPS) location.

16. The non-transitory, computer readable storage medium of claim 13, wherein the original pose data comprises pose data determined by an automatic bundle adjustment process.

17. The non-transitory, computer readable storage medium of claim 13, wherein the second user input further comprises constraint points for the one or more three-dimensional primitive shapes.

18. The non-transitory, computer readable storage medium of claim 13, wherein the provided plurality of images comprise one or more of an oblique aerial photograph of the Earth, a panoramic photograph taken from street-level, or a photograph inputted by a user.

19. A computer implemented method of improving pose data for images, comprising:
(a) receiving, by one or more computing devices, a first user input comprising a user-selected location;
(b) providing, by the one or more computing devices, a plurality of images, each of the plurality of images showing a building at the user-selected location, wherein each of the plurality of images is associated with original pose data;
(c) receiving, by the one or more computing devices, adjusted pose data for a two-dimensional image in the plurality of images, wherein the adjusted pose data is calculated based on a mapping of a position on the two-dimensional image to a feature of a three-dimensional model of the building, such that when the three-dimensional model is rendered with the two-dimensional image from a perspective specified by the adjusted pose data, the feature of the three-dimensional model appears at the position of the two-dimensional image;
(d) determining, by the one or more computing devices, whether the adjusted pose data is superior to the original pose data;
(e) when the adjusted pose data is determined to be superior to the original pose data, associating, by the one or more computing devices, the adjusted pose data with the two-dimensional image; and
(f) receiving, by the one or more computing devices, updated pose data for each of plurality of images other than the two-dimensional image, the original nose data for each of the plurality of images having been respectively updated based on the adjusted pose data of the two-dimensional image and information describing a respective change in pose between the two-dimensional image and each of the plurality of images other than the two-dimensional image.

\* \* \* \* \*

UNITED STATES PATENT AND TRADEMARK OFFICE
CERTIFICATE OF CORRECTION

PATENT NO. : 8,884,950 B1  
APPLICATION NO. : 13/194177  
DATED : November 11, 2014  
INVENTOR(S) : Brown et al.

Page 1 of 1

It is certified that error appears in the above-identified patent and that said Letters Patent is hereby corrected as shown below:

Claims

Column 12, Line 16, Claim 19, after word "original", please delete "nose" and insert --pose--.

Signed and Sealed this
Sixteenth Day of August, 2016

Michelle K. Lee
*Director of the United States Patent and Trademark Office*